(12) United States Patent
Yeom et al.

(10) Patent No.: US 8,400,767 B2
(45) Date of Patent: Mar. 19, 2013

(54) ELECTRONIC APPARATUS WITH STABLE SUPPORT MEMBER SYSTEM

(75) Inventors: Yun-pil Yeom, Gyeonggi-do (KR); Sung-woo Park, Gyeonggi-do (KR); Jin-hyuk Ahn, Gyeonggi-do (KR)

(73) Assignee: Samsung Electronics Co., Ltd., Samsung-ro, Yeontong-gu, Suwon-si, Gyeonggi-do (KR)

( * ) Notice: Subject to any disclaimer, the term of this patent is extended or adjusted under 35 U.S.C. 154(b) by 7 days.

(21) Appl. No.: 12/847,055

(22) Filed: Jul. 30, 2010

(65) Prior Publication Data

US 2011/0164357 A1 Jul. 7, 2011

(30) Foreign Application Priority Data

Jan. 6, 2010 (KR) .................. 10-2010-0000795

(51) Int. Cl.
*H05K 5/00* (2006.01)
*H05K 7/00* (2006.01)

(52) U.S. Cl. ......... 361/679.59; 361/679.22; 361/679.26; 361/679.3; 361/679.55; 361/679.56; 348/836; 348/838; 348/843; 248/917; 248/918; 248/919

(58) Field of Classification Search ............. 361/679.21, 361/679.22, 679.26, 679.3, 679.55, 679.56, 361/679.59; 348/836, 838, 843; 248/917, 248/918, 919

See application file for complete search history.

(56) References Cited

U.S. PATENT DOCUMENTS

| | | | | |
|---|---|---|---|---|
| 6,061,104 | A * | 5/2000 | Evanicky et al. | 248/274.1 |
| 7,143,478 | B2 * | 12/2006 | Quijano | 16/445 |
| 7,760,493 | B2 * | 7/2010 | Liou et al. | 361/679.21 |
| 7,937,810 | B2 * | 5/2011 | Hu | 16/241 |
| 2005/0269479 | A1 * | 12/2005 | Yeh et al. | 248/457 |
| 2007/0062089 | A1 * | 3/2007 | Homer et al. | 40/754 |
| 2009/0231797 | A1 * | 9/2009 | Kim | 361/679.27 |
| 2010/0067184 | A1 * | 3/2010 | Liou et al. | 361/679.21 |

\* cited by examiner

*Primary Examiner* — Anthony Haughton
(74) *Attorney, Agent, or Firm* — Cha & Reiter, LLC

(57) ABSTRACT

An electronic apparatus includes a display panel which displays an image; a cover unit which covers the display panel; and support system including a support member. The support member which includes a hinge unit which is rotably formed in the forward and backward directions in the rear side of the cover unit, a first support which is downwardly bent and extends from the hinge unit, and a second support which is upwardly bent and extends from the hinge unit. The configuration of the support system on the electronic apparatus permits a stable support at a variety of angles on an installation plane.

16 Claims, 6 Drawing Sheets

ELECTRONIC APPARATUS WITH STABLE SUPPORT MEMBER SYSTEM

CLAIM OF PRIORITY

This application claims priority from Korean Patent Application No. 10-2010-0000795, filed on Jan. 6, 2010 in the Korean Intellectual Property Office, the disclosure of which is incorporated herein by reference in its entirety.

BACKGROUND OF THE INVENTION

1. Field of the Invention

The present invention relates to support members for positioning an electronic apparatus. More particularly, the present invention relates to an electronic apparatus such as a display for a computer, or a single unit computer, pda, communication unit, etc., which is capable of being stably installed at a variety of angles on an installation plane.

2. Description of the Related Art

FIG. 1 shows an example of a conventional monitor 100 which is one type of a general electronic apparatus and has a display panel on which an image is displayed. A monitor body 110 of the conventional monitor 100 is supported by a support member 120 provided in the rear of the monitor body 110 opposite the side of the display. However, the support member 120 has a drawback in that it may not stably support the monitor body 110 in a variety of angles. For example, with regard to the recently-developed touch panel monitors, if a user exerts a physical force on the monitor body 110 for monitor operation, the monitor body 110 may fall down without being supported properly.

SUMMARY OF THE INVENTION

Accordingly, one or more exemplary embodiments provide an electronic apparatus having a support member which is capable of being stably installed at a variety of angles on an installation plane.

The foregoing and/or other exemplary aspects may be achieved by providing an electronic apparatus including: a display panel which displays an image; a cover unit which covers the display panel; and a support member system which includes a hinge unit which is rotably formed in the forward and backward directions in the rear side of the cover unit, a first support which is downward bent and extends from the hinge unit, and a second support which is upward bent and extends from the hinge unit.

According to an exemplary aspect of the present invention, the first and second supports may be integrated and are interconnected with a closed loop shape.

In addition, the first support may be formed to be longer than the second support.

According to another exemplary aspect of the present invention, the hinge unit may be formed in an upper region of the cover unit.

In another exemplary aspect of the present invention, an angle between the first and second supports may be more than 90° and less than 160°.

The cover unit discussed above may preferably include a support bracket which supports the display panel, a front cover which covers a front side of the display panel, and a rear cover which covers a rear side of the support bracket, and the hinge unit may be coupled to the support bracket.

The hinge unit discussed above may preferably include: a hinge shaft; a hinge bracket which rotably couples the hinge shaft to the support bracket; and a hinge shaft connector which connects the first and second supports to the hinge shaft.

The hinge shaft, the hinge shaft connector and the first and second supports may be coupled using a single screw.

The rear cover may be formed with a through-hole which provides a rotation space of the hinge shaft connector.

In another exemplary aspect of the present invention, the hinge shaft may have a non-circular peripheral surface having a plurality of edges, and the hinge shaft connector may be formed to surround at least one of the plurality of edges of the hinge shaft.

The support member may further include a non-slip member that is formed in the bottom of the first support.

The display panel may be provided as a touch screen.

The electronic apparatus may be an all-in-one computer which accommodates at least a main board, a central processing unit and a memory within the cover unit, including but in no way limited to a tablet computer, PDA, etc.

The foregoing and/or other exemplary aspects may be achieved by providing an electronic apparatus including: a display panel which displays an image; a cover unit which covers the display panel; and a support member which supports the cover unit with respect to an installation plane, wherein the support member includes: a hinge unit which is rotably formed in the forward and backward directions in the rear side of the cover unit; a first support which is downward bent and extends from the hinge unit and reciprocates between a support position at which the first support recedes (i.e. pivots away from) from the cover unit by rotation of the hinge shaft and supports the cover unit with respect to an installation plane and an approach position at which the first support approaches the cover unit; and a second support which is upward bent and extends from the hinge unit, approaches (i.e. pivots toward) the cover unit at the support position of the first support, and recedes (i.e. pivots away from) from the cover unit at the approach position of the first support.

According to an exemplary aspect of the present invention, the hinge unit may be formed, for example, in an upper region of the cover unit, and the first support may be formed to be longer than the second support.

The first and second supports may be integrated and may be interconnected with a closed loop shape.

The electronic apparatus may comprise, for example an all-in-one computer including but in no way limited to a tablet computer or touch screen in which accommodates at least a main board, a central processing unit and a memory within the cover unit.

According to another exemplary aspect of the present invention, the electronic apparatus can be stably installed at a variety of angles on an installation plane.

BRIEF DESCRIPTION OF THE DRAWINGS

The above and/or other exemplary aspects will become apparent to a person of ordinary skill in the art and more readily appreciated from the following description of the exemplary embodiments, taken in conjunction with the accompanying drawings, in which.

DETAILED DESCRIPTION

Figure 1:
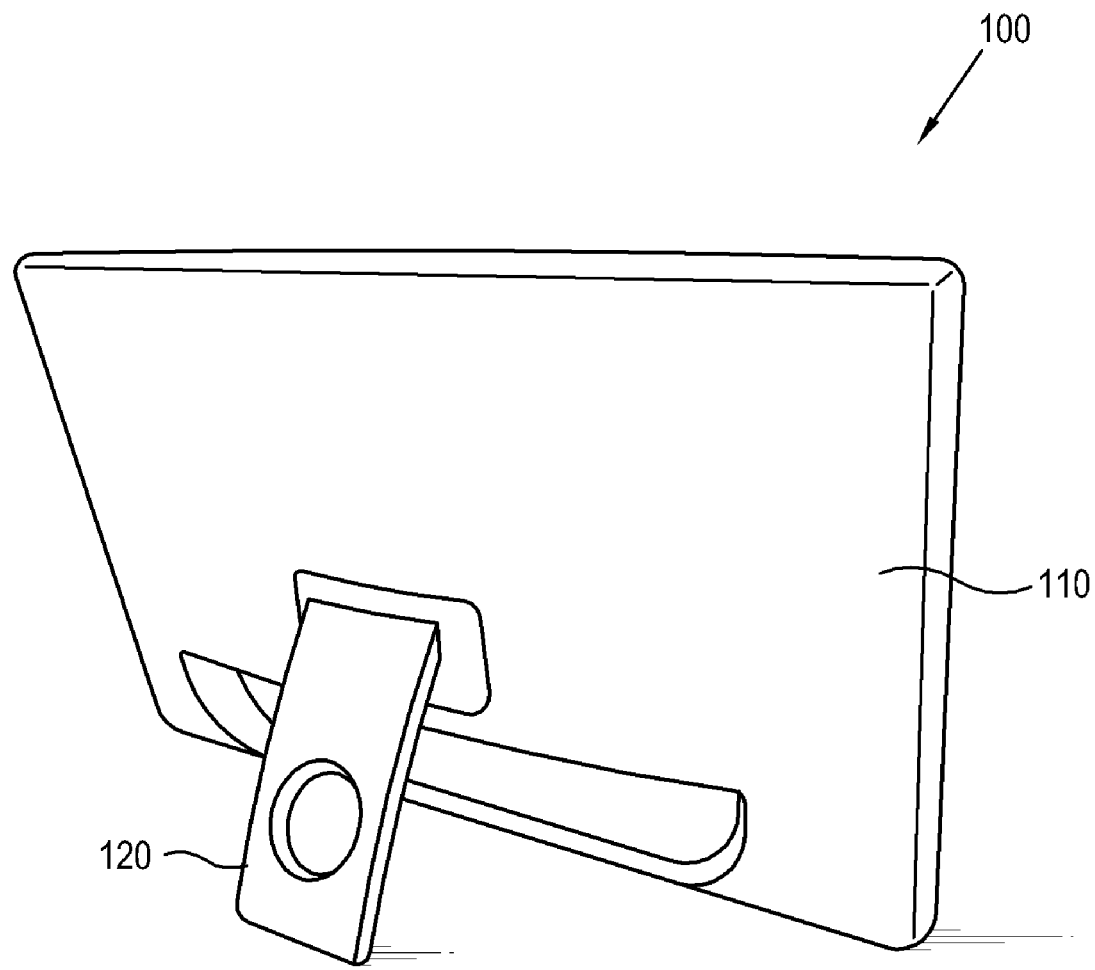
FIG. 1 is a perspective view showing a support structure of a conventional electronic apparatus.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts maybe omitted so as not to obscure appreciation by an artisan of the subject matter of the present invention, and like reference numerals refer to like elements throughout.

Prior to the detailed description herein below, it is noted that an electronic apparatus 1 according to an exemplary embodiment of the present invention is illustrated with an all-in-on computer which accommodates at least a main board (not shown), a central processing unit (not shown) and a memory (not shown) within a over unit 20, but may be implemented by a television, a monitor, a portable multimedia player (PMP), an electronic frame, or other electronic apparatuses which display images, just to name a few of the many examples to which the claimed invention can be applied.

Figure 2:
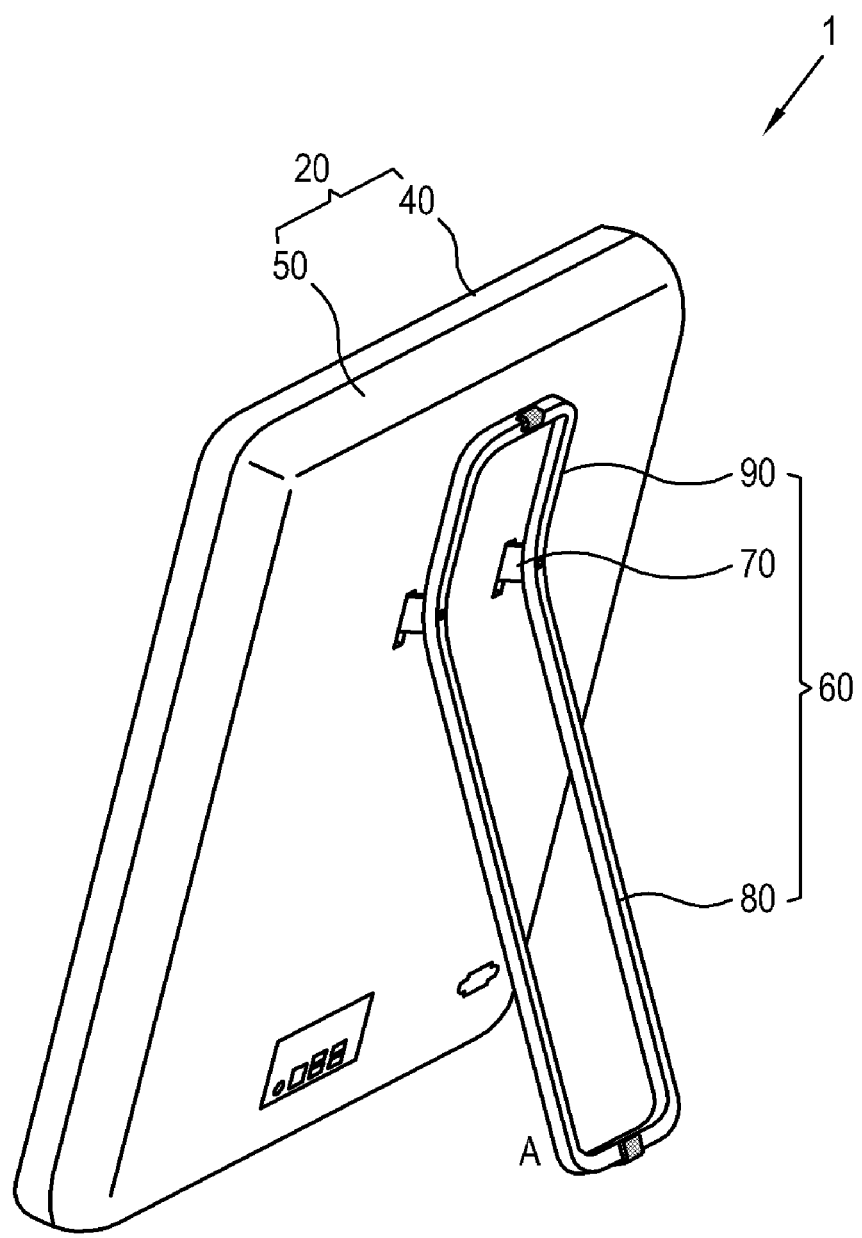
FIG. 2 is a perspective view of an electronic apparatus according to an exemplary embodiment of the present invention.
Figure 3:
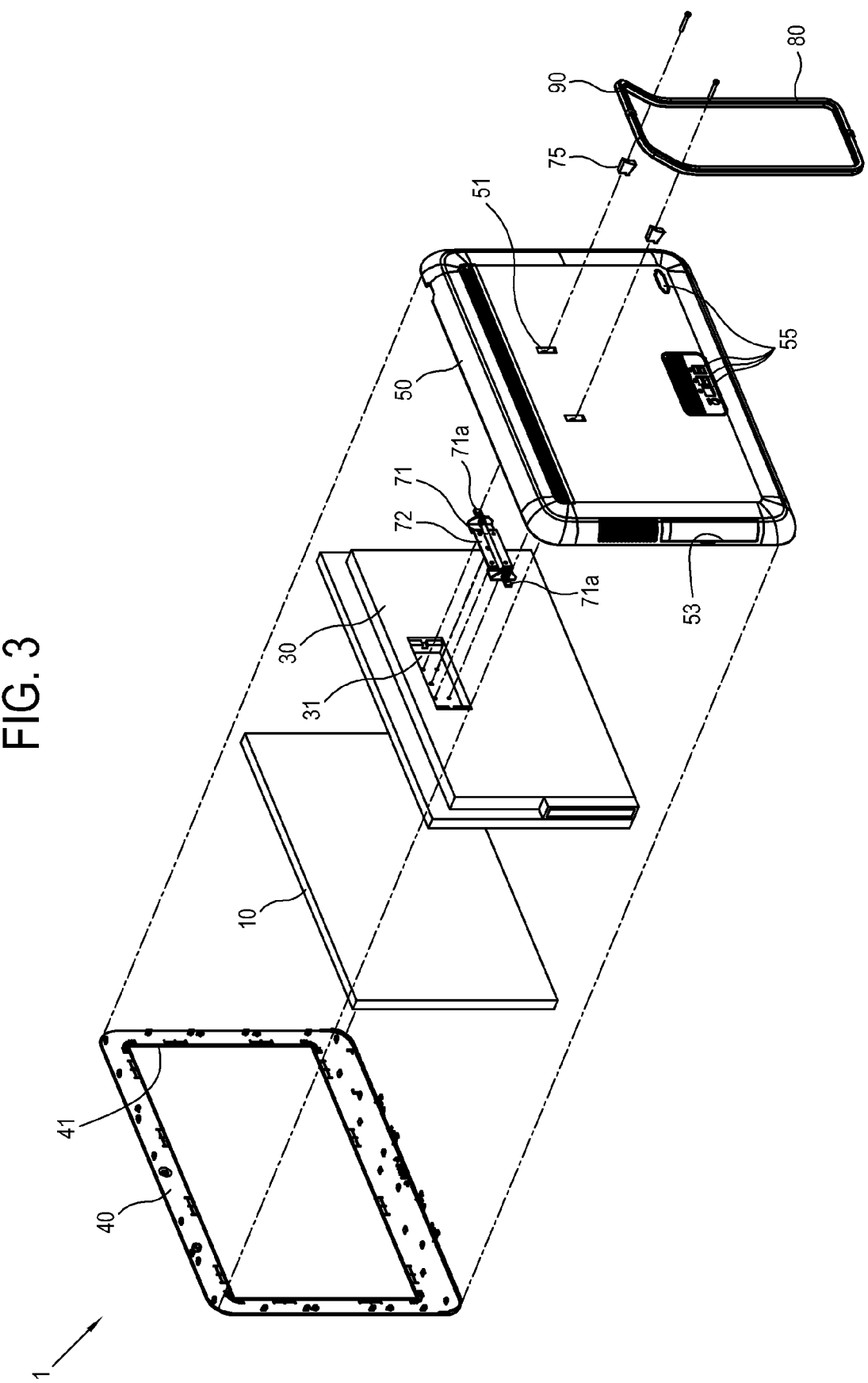
FIG. 3 is an exploded perspective view of the electronic apparatus according to the exemplary embodiment of the present invention.

Referring now to FIGS. 2 and 3, the electronic apparatus 1 according to this exemplary embodiment includes a display panel 10, a cover unit 20 and a support member 60.

The display panel 10 displays an image. The display panel 10 may be a flat display panel such as a liquid crystal display (LCD), a plasma display panel (PDP) or the like. In addition, any type of thin-film screen technology can be used. In this exemplary embodiment, the display panel 10 is preferably a tablet panel. The display panel 10 is accommodated in the cover unit 20.

The cover unit 20, which accommodates the display panel 10, may include a support bracket 30 (FIG. 3) which supports the display panel, a front cover 40 which covers a front portion of the display panel 10, and a rear cover 50 which covers the rear portion of the support bracket 30. Together, the front cover 40 and rear cover 50 connect so that the lateral walls of the display panel 10 and the support bracket 30 are enclosed within, and as can be appreciated by a person of ordinary skill in the art, the front and rear covers 40, 50 are proportionally sized such that the cover unit 20 preferably covers an entirety of a lateral area (i.e. the side walls) of the electronic apparatus. The support bracket 30 preferably is formed into a plate shape to cover the rear side of the display panel 10.

The support bracket 30 is mounted on the rear side of the display panel 10 and has mounted thereon with a hard disk (not shown), a main board (not shown), a central processing unit (CPU) (not shown) and a main memory (not shown). In addition, an optical disc drive (ODD) (not shown) may be mounted on one side of the support bracket 30. Such a support bracket 30 is preferably made of a metallic material having relatively high strength. Moreover, the support bracket 30 is formed therein with a hinge mount 31 to be mounted thereon with a hinge unit 70, which will be described later. The hinge mount 31 is preferably formed in a central region in the horizontal direction of the support bracket 30, or in an upper region in its vertical direction.

With continued reference to FIG. 3, the front cover 40 has an opening 41 through which the display panel 10 is exposed, and covers the border of the display panel 10. The front cover 40 is coupled to the rear cover 50, with the display panel 10 and the support bracket 30 interposed between the coupled front cover 40 and the rear cover 50.

The rear cover 50 covers the rear side of the support bracket 30. The rear cover 50 may be formed therein with an ODD mount 53 to be mounted thereon with an ODD, and connection ports 55 to which external devices such as a keyboard, a mouse, a printer, a scanner and so on are connected. The rear cover 50 may be formed therein with a plurality of through-holes 51 through which hinge shaft connectors 75 pass and which provide a rotation space for the hinge shaft connectors 75.

As shown in FIG. 1, the support member 60 includes the hinge unit 70, a first support 80 and a second support 90. The hinge unit 70 is rotably provided forward and backward in the rear side of the cover unit 20. In this exemplary embodiment, the hinge unit 70 is coupled to the support bracket 30, which is typically arranged inside the cover 50 in order to secure sufficient support strength. Alternatively, the hinge unit 70 may be coupled to the rear cover 50. The hinge unit 70 preferably includes a hinge shaft 71, a hinge bracket 72 and the hinge shaft connectors 75.

Figure 4:
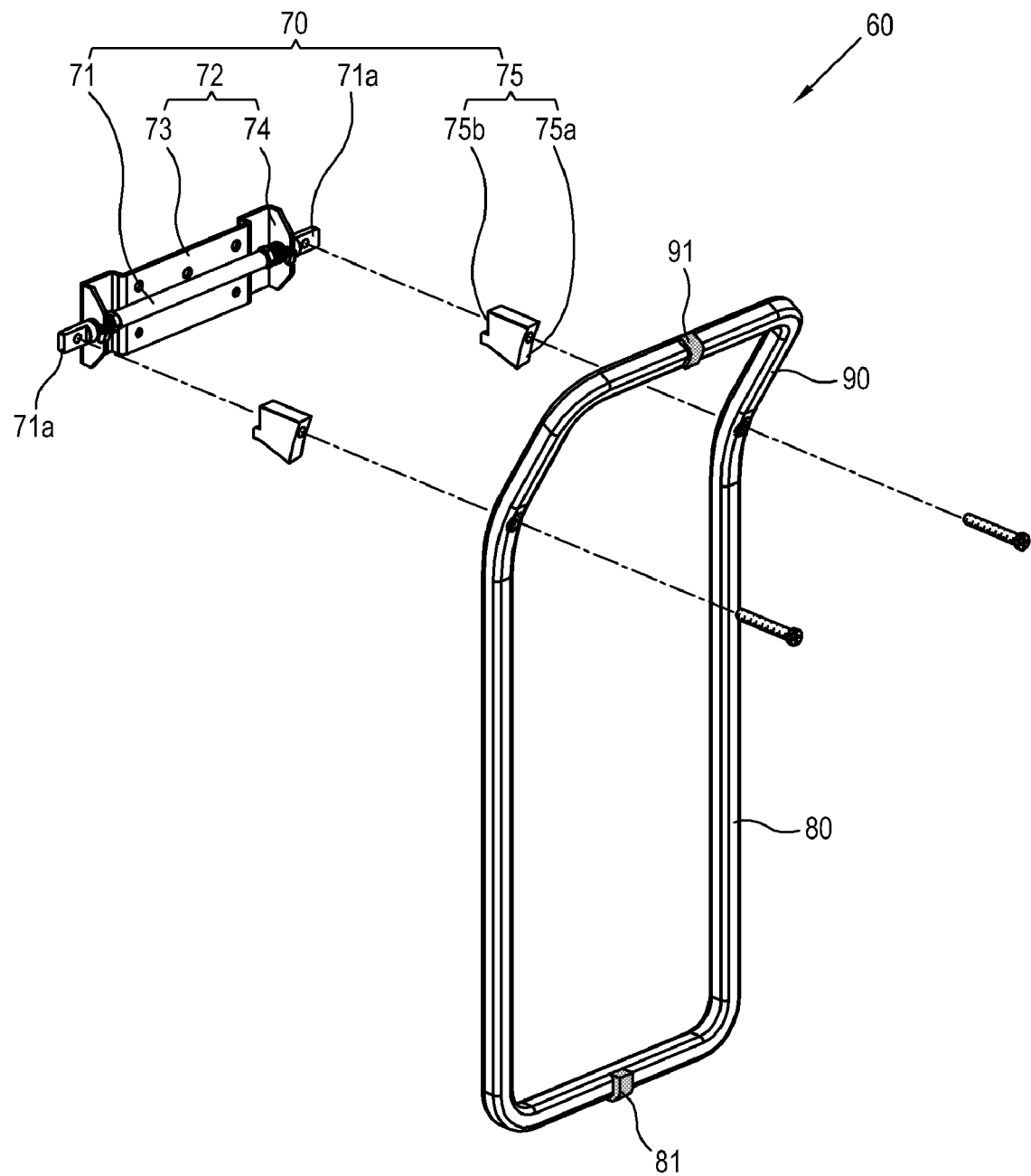
FIG. 4 is an exploded perspective view showing a coupling relationship of a support member of the electronic apparatus according to the exemplary embodiment of the present invention.

As shown in FIG. 4, the hinge shaft 71 is formed into an elongated bar shape. The hinge shaft 71 typically is rotably coupled to the hinge bracket 72 such that both end portions 71a of the hinge shaft 71 are exposed to the outside. Although it is illustrated in this exemplary embodiment that the hinge shaft 71 is formed into a single bar, the hinge shaft is not limited to the drawing shown and described, and may, for example, include a pair of hinge shafts 71 formed in both sides of the hinge bracket 72, respectively. It is here noted that both end portions 71a of the hinge shaft 71 indicate a region exposed to the outside of the hinge bracket 72.

Both end portions 71a of the hinge shaft 71 may have a non-circular peripheral surface having a plurality of edges. In other words, both end portions 71a of the hinge shaft 71 can have a non-circular section along a rotation direction. In this exemplary embodiment, both end portions 71a of the hinge shaft 71 have a rectangular section. In addition, both end portions 71a of the hinge shaft 71 is fastened by screws to the hinge shaft connectors 75 which will be described herein later.

Both end portions of the hinge bracket 72 are formed into a "⊏" shape and are coupled to the support bracket 30. The hinge bracket 72 includes a bracket body 73 whose plate contacts and is supported to the support bracket 30, and a pair of bracket wings 74 which project backward from both end portions of the bracket body 73. The bracket body 73 is fastened to the support bracket 30 typically by screws, but other types of fasteners, bolts, pins, snaps, adhesive, magnets, etc. can be used. In addition, the pair of bracket wings 74 is formed therein with hinge shaft through-holes (not shown) through which the hinge shaft 71 passes.

The hinge shaft connectors 75 connect the first support 80 and the second support 90 to the hinge shaft 71. The hinge shaft connectors 75 each include end portions 75a coupled respectively to bent regions of the first support 80 and the second support 90 and the other end portions 75b coupled respectively to both end portions 71a of the hinge shaft 71. In this exemplary embodiment, it is preferable that the first support 80 is fastened to the second support 90 by a single screw and the hinge shaft connectors 75 are also fastened to the hinge shaft by a single screw.

At a first end portion 75a of the hinge shaft for each of the connectors 75 there is a curved surface corresponding to the bent regions of the first and second supports 80 and 90.

The second end portion 75b of each of the hinge shafts 75 is formed to correspond to a shape of the end portions 71a of the hinge shaft 71. The second end portions 75b of the hinge shaft connectors 75 are formed to surround one edge of the hinge axis 71.

As shown in FIG. 4, if both end portions 75b of the hinge shaft 71 have a rectangular longitudinal section, the second end portions 75b of the hinge shaft connectors 75 are formed to cover a lower edge region of the respective end portions 71a of the hinge shaft 71. This arrangement allows torque of the first and second supports 80 and 90 to be delivered to the hinge shaft 71 efficiently.

In addition, this arrangement can alleviate a possibility of running idle of the hinge shaft 71 at the hinge shaft connectors 75 due to the weight of the electronic apparatus 1 and allow the hinge shaft connectors 75 to support the hinge shaft 71 more stably.

Although it is illustrated in this exemplary embodiment that the hinge shaft connectors 75 are separated from the first and second supports 80 and 90, they may be integrated with the first and second supports 80 and 90.

Figure 5:
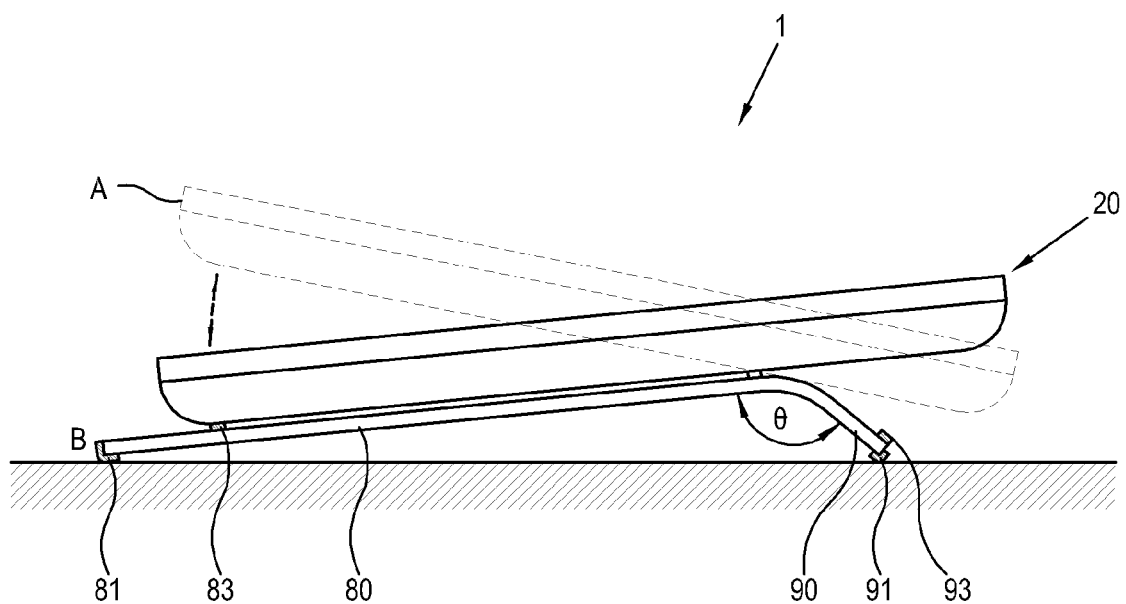
FIGS. 5 and 6 are perspective views showing use conditions of the electronic apparatus according to the exemplary embodiment of the present invention.

As shown in FIG. 5, the first support 80 is formed to be downwardly bent and extend from the hinge shaft 71. The first support 80 is formed preferably as a 'U'-like bent bar. The first support 80 reciprocates between a support position "A" at which the first support 80 recedes from the rear cover 50 by rotation of the hinge shaft connectors 75 and supports the electronic apparatus 1 with respect to an installation plane and an approach position B at which the first support 80 approaches the rear cover 50. At the support position A, the first support 80 supports the cover unit 20 with respect to the installation plane such that the display panel 10 directs to the front side with a predetermined angle.

Still referring to FIG. 5, the bottom of the first support 80 may be attached with a non-slip member 81 to prevent the first support 80 from being slid with respect to the installation plane and a plane facing the rear cover 50 may be attached with a buffer member 83 to buffer an impact in contact with the rear cover 50.

The second support 90 is formed to be upwardly bent and extend from the hinge shaft 71. The second support 90 is formed as an inverted 'U'-like bent bar. The second support 90 approaches or contacts and supports the rear cover 50 at the support position A of the first support 80. The second support 90 is separated from the rear cover 50 at the approach position B of the first support 80. The second support 90 can stably support the cover unit 20 by contacting and supporting the rear cover 50 at the support position A of the first support 80 and can be used as a knob at the approach position B of the first support 80.

As shown in FIGS. 4 and 5, the top of the second support 90 may be attached with a non-slip member 91 to prevent the second support 90 from being slid with respect to the installation plane, and a plane facing the rear cover 50 may be attached with a buffer member 93 to buffer an impact in contact with the rear cover 50.

As shown in FIG. 4, the first and second supports 80, 90 are preferably integrated and are interconnected with a closed loop shape.

The first support 80 is preferably formed to be longer than the second support 90. This difference in size allows the first support 80 to support the cover unit 20 such that the display panel 10 directs to the front at the support position A (shown in FIG. 5).

An angle θ between the first and second supports 80, 90 is preferably greater than 90° and less than 160°.

Hereinafter, operation of the electronic apparatus 1 according to the exemplary embodiment of the present invention will be described in detail herein below.

First, as shown in FIG. 2, if the display panel 10 is directed toward the front, the first support 80 is moved to the support position A.

Next, as shown in FIG. 5, if the display panel 10 is directed toward the top, the first support 80 is moved to the approach position B.

Figure 6:
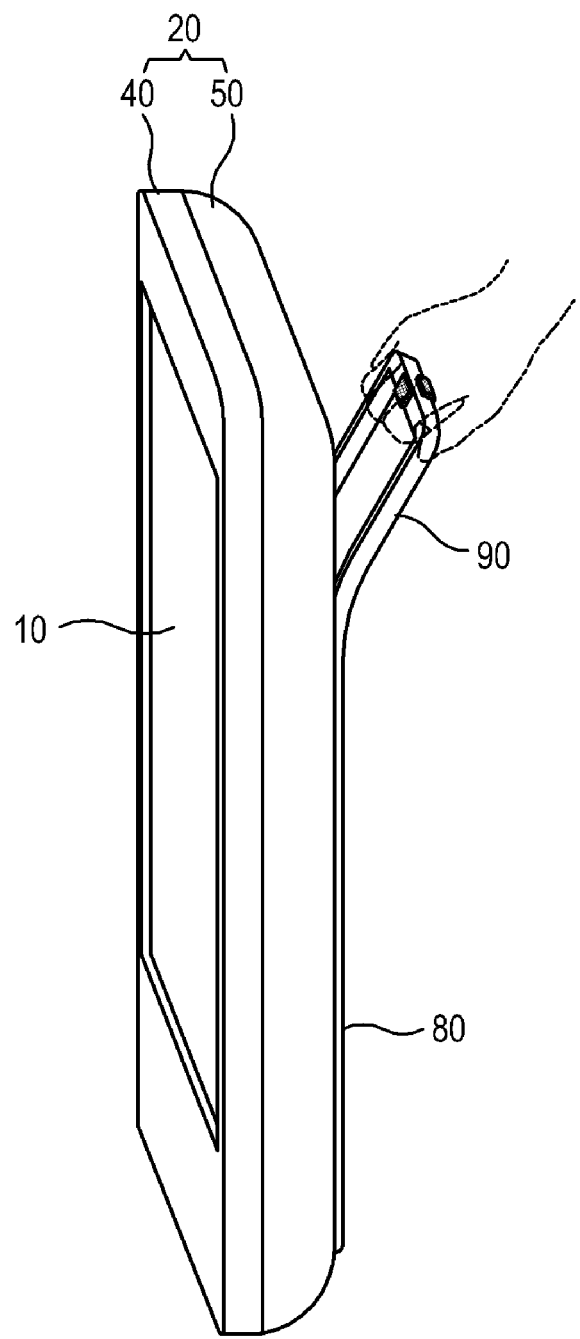

Next, as shown in FIG. 6, if the electronic apparatus 1 is being transported, the first support 80 is moved to the approach position B, and then, the second support 90 is grasped and transported.

Although a few exemplary embodiments have been shown and described herein, it will be appreciated by those skilled in the art that various changes may be made in these exemplary embodiments without departing from the principles and spirit of the invention and the scope of the appended claims and their equivalents. For example, the type fasteners users, the shape of the supports are not limited to the examples shown herein.

What is claimed is:

1. An electronic apparatus comprising:
   a display panel which displays an image;
   a cover unit including a front cover which covers a front portion of the display panel, a rear cover, and a support bracket arranged between the display panel and the rear cover, the support bracket supporting the display panel, and the rear cover covering a rear portion of the support bracket; and
   a support member system including: i) a hinge unit that rotates in forward and backward directions and is arranged at the rear cover of the cover unit; ii) a first support having a downward bend and extending from the hinge unit; and iii) a second support, shorter than the first support, having an upward bend and extending from the hinge unit;
   wherein the hinge unit is coupled to the support bracket and is arranged at an upper region of the cover unit.

2. The electronic apparatus according to claim 1, wherein the first support and second support are integrally formed.

3. The electronic apparatus according to claim 1, wherein the hinge unit is arranged at least partially within an upper region of the cover unit.

4. The electronic apparatus according to claim 1, wherein an angle between the first and second supports is greater than 90° and less than 160° C.

5. The electronic apparatus according to claim 1, wherein the front cover and rear cover of the cover unit are proportionally sized such that the cover unit covers an entirety of a lateral area of the electronic apparatus.

6. The electronic apparatus according to claim 1, wherein the hinge unit includes:
   a hinge shaft;
   a hinge bracket which rotably couples the hinge shaft to the support bracket; and
   a hinge shaft connector which connects the first support and the second support to the hinge shaft.

7. The electronic apparatus according to claim 6, wherein the hinge shaft, the hinge shaft connector and the first and second supports are coupled using a single fastener.

8. The electronic apparatus according to claim 6, wherein the rear cover has a through-hole therein which defines a rotation space of the hinge shaft connector.

9. The electronic apparatus according to claim 6, wherein the hinge shaft has a non-circular peripheral surface having a plurality of edges, and
wherein the hinge shaft connector is arranged to surround at least one of the plurality of edges of the hinge shaft.

10. The electronic apparatus according to claim 1, wherein the support member further includes a non-slip member which arranged at a bottom of the first support.

11. The electronic apparatus according to claim 1, wherein the display panel comprises a touch screen.

12. The electronic apparatus according to claim 1, wherein the electronic apparatus comprises an all-in-one computer which accommodates at least a main board, a central processing unit and a memory within the cover unit.

13. The electronic apparatus according to claim 11, wherein the electronic apparatus comprises an all-in-one computer which accommodates at least a main board, a central processing unit and a memory within the cover unit.

14. An electronic apparatus comprising:
a display panel which displays an image;
a cover unit which covers at least a portion of the display panel; and
a support member which supports the cover unit with respect to an installation plane,
wherein the support member includes:
a hinge unit which rotates in the forward and backward directions and is arranged in a rear side of the cover unit;
a first support which has a downward bend and extends from the hinge unit to reciprocate between a support position at which the first support pivots away from the cover unit by rotation of the hinge and supports the cover unit in a first orientation with respect to an installation plane, and an approach position at which the first support pivots toward the cover unit; and
a second support which has an upward bend and extends from the hinge unit, said second support pivots toward the cover unit at the support position of the first support, and pivots away from the cover unit at the approach position of the first support, so as to support the cover unit in a second orientation with respect to an installation plane, which second orientation is substantially different from said first orientation;
wherein,
the first support and second support are interconnected with a closed-loop shape;
the first support is longer than the second support;
the hinge unit is arranged at an upper region of the cover unit;
an angle between the first and second supports is greater than 90° and less than 160° C. ;
the cover unit includes a support bracket arranged in back of the display panel along a rear portion and which supports the display panel, a front cover which covers a front portion of the display panel, and a rear cover which covers a rear portion of the support bracket, and
the hinge unit is coupled to the support bracket.

15. The electronic apparatus according to claim 14, wherein the electronic apparatus comprises an all-in-one computer which accommodates at least a main board, a central processing unit and a memory within the cover unit.

16. An electronic apparatus comprising:
a display panel having front and rear portions, the front portion for displaying an image;
a cover unit having front and rear covers, the rear cover covering at least a portion of a rear portion of the display panel; and
a support member system which includes a hinge unit which rotates in forward and backward directions and is arranged at a rear side of the cover unit, a first support having a downward bend and extending in a downward direction from the hinge unit to rotate through the hinge unit, and a second support having an upward bend and extending from the hinge unit in an upward direction to rotate through the hinge unit, said display panel being positionable into first and second substantially different stable angular orientations with respect to a generally horizontal installation surface, where in the first stable position said hinge is rotated so that a portion of said first support supports the rear portion of said cover unit, and where in the second stable position said hinge is rotated so that a portion of said second support supports the rear portion of said cover unit;
wherein,
the first support and second support are interconnected with a closed-loop shape;
the first support is longer than the second support;
the hinge unit is arranged at an upper region of the cover unit;
an angle between the first and second supports is greater than 90° and less than 160° C. ;
the cover unit includes a support bracket arranged in back of the display panel along a rear portion and which supports the display panel, the front cover covers a front portion of the display panel, and the rear cover covers a rear portion of the support bracket, and
the hinge unit is coupled to the support bracket.

* * * * *